United States Patent [19]

Morita

[11] Patent Number: 5,323,152
[45] Date of Patent: Jun. 21, 1994

[54] APPARATUS FOR DETECTING THE POSITION OF A VEHICLE

[75] Inventor: Kazuya Morita, Osaka, Japan

[73] Assignee: Sumitomo Electric Industries, Ltd., Osaka, Japan

[21] Appl. No.: 45,599

[22] Filed: Apr. 9, 1993

[30] Foreign Application Priority Data

Apr. 15, 1992 [JP] Japan ................................. 4-095414
Apr. 15, 1992 [JP] Japan ................................. 4-095415

[51] Int. Cl.$^5$ .......................................... G08G 1/123
[52] U.S. Cl. ................................. 340/988; 340/990; 340/995
[58] Field of Search ...................... 340/988, 990, 995

[56] References Cited

U.S. PATENT DOCUMENTS 4,924,699 5/1990 Kuroda ........................... 340/990 X

FOREIGN PATENT DOCUMENTS

61-138114 6/1986 Japan ................................. 340/988
2275310 11/1990 Japan ................................. 340/988
9213284 8/1992 PCT Int'l Appl. ................. 340/990

Primary Examiner—Hezron E. Williams
Assistant Examiner—Christine K. Oda
Attorney, Agent, or Firm—Lane, Aitken & McCann

[57] ABSTRACT

A vehicle position detecting apparatus comprises vehicle position estimating means for estimating a vehicle position on the basis of the travel direction and distance of a vehicle detected respectively by direction and distance detecting means, travel road determining means for determining a current travel road of the vehicle by comparing the estimated vehicle position and road network data stored by road network data storing means, vehicle position calculating means for calculating accurate vehicle position on the basis of the vehicle position data supplied by a designated satellite combination formed by a plurality of satellites revolving around the earth, and position correcting means for correcting the vehicle position estimated by the estimating means on the basis of the accurate vehicle position calculated by the accurate vehicle position calculating means in such a manner that the vehicle position data supplied from the designated satellite combination includes a minimum error in an extending direction of the determined travel road in the neighborhood of the estimated vehicle position. Various errors detected by sensors or means forming part of the vehicle position detecting apparatus can be minimized so as to enhance the accuracy of the vehicle position at a higher level.

3 Claims, 9 Drawing Sheets

APPARATUS FOR DETECTING THE POSITION OF A VEHICLE

FIELD OF THE INVENTION

The present invention relates to an apparatus for detecting the position of an automotive vehicle, an more specifically relates to an apparatus which can detect and correct the position and the travel direction of the vehicle for obtaining an precise vehicle position.

DESCRIPTION OF THE PRIOR ART

There have been so far proposed a wide variety of such methods each of which is effected with a direction sensor and a distance sensor for deriving the travel path of a vehicle. The above method of deriving the travel path of the vehicle is called a "dead reckoning method" since the position of the vehicle is detected by the direction and distance sensors mounted thereon. The dead reckoning method requires not only such direction and distance sensors but also a processing unit for processing output signals produced from the direction and distance sensors. Further, the dead reckoning method produces vehicle position data on the basis of a distance variation quantity $\delta L$ and vehicle direction $\theta$ derived during cruising of the vehicle. For example, the east-west component $\delta x (= \delta L \cdot \cos \theta)$ and north-south component $\delta y (= \delta L \cdot \sin \theta)$ of the distance variation quantity $\delta L$ are calculated and added to the calculated position data (Px', Py') for calculation of a current position data (Px, Py). The vehicle position detecting apparatus employing the above method is relatively easily mounted on the vehicle, resulting from no need of external assist facilities. However, the direction and distance sensors entail errors in response to the travel distance being increased, thereby causing the errors of the position detection to be accumulated. For example, a geomagnetic sensor is used as a direction sensor for detection of an absolute direction of a vehicle, wherein the output of the geomagnetic sensor brings about errors. This results from the fact that the geomagnetic sensor monitors excessively weak strength of the earth geomagnetic field to calculate the absolute direction of a moving body such as a vehicle body, thereby resulting in errors in the output of the geomagnetic sensor if the moving body having the geomagnetic sensor mounted thereon is magnetized. In order to cancel such errors caused in the geomagnetic sensor, an initialization processing is required for the geomagnetic sensor.

On the other hand, the vehicle is subject to the influence of strong magnetic disturbances from the outside of the outside of the vehicle in addition to the influence of the excessively weak strength of the earth geomagnetic field, when the vehicle crosses and passes through railroad crossings, electric cable embedding sites, iron bridges, soundproof-walled highways, high-rise buildings and the like so that the magnetization amount of the vehicle is varied, thereby producing additional errors in the output of the geomagnetic sensor. In order to overcome such errors of the geomagnetic sensors as caused by the influences of the excessively weak strength of the earth geomagnetic field and the strong disturbances caused by the above mentioned structures and the facilities from the outside of the vehicle, there has been proposed a map matching method which can reduce such errors of the position detection accumulated in an aforementioned manner by matching the patterns between the road networks and the travel paths derived by the direction and distance sensors. Such a vehicle position detecting apparatus employing the map matching method is disclosed in, for example, Japanese patent laid-open publication Nos. 63-148115, 63-115004, and 64-53112.

However, the above vehicle position detecting apparatus encounters such difficulties that position errors calculated by the dead reckoning method can not be corrected for detection of the precise position of the vehicle if the road network data is outdated and thus inaccurate and the road network is of complicated pattern and minute lattice. This arises another problem in that a driver recognizes a wrong road in lieu of a correct road during driving his vehicle. Once the driver misreads the vehicle position, a long time is needed for recovering the precise position of the vehicle. For this reason, someone might propose enhancement for the accuracy of the road network data, however, another difficulty such as the abrupt increase of work force and cost for production of the road network data arises. To enhance the reliability of the map matching method is another task for those skilled in the art. For example, another vehicle position detecting apparatus is proposed as disclosed in Japanese patent laid-open publication No. 2-275310. The above vehicle position detecting apparatus is designed to use a global positioning system (hereinlater simply referred to as "GPS") for detection of the vehicle position so as to correct an estimated vehicle position derived from the direction and distance sensors on the basis of the vehicle position (hereinafter referred to as "accurate vehicle position") derived from the GPS, thereby making effective the map matching method. The GPS is a system for detecting the accurate vehicle position on the basis of electric waves transmitted from man-made satellites. More specifically, the electric waves are transmitted from three or more satellites revolving around their predetermined orbits to a GPS receiver mounted on the vehicle so as to make it possible to calculate the propagated delay times of the electric waves from the respective satellites to the GPS receive of the vehicle for measurement of two or three dimensional position of the vehicle. The vehicle position detecting apparatus using the GPS ensures enhancement of the accuracy of the vehicle position, however, the accurate vehicle position derived from the GPS is located in the scope of error distribution in the form of a certain ellipse. The scope of error distribution is frequently larger than that of the estimated vehicle position as mentioned above, thereby making it impossible to enhance the accuracy of the vehicle position by the map matching method.

Figure 10:
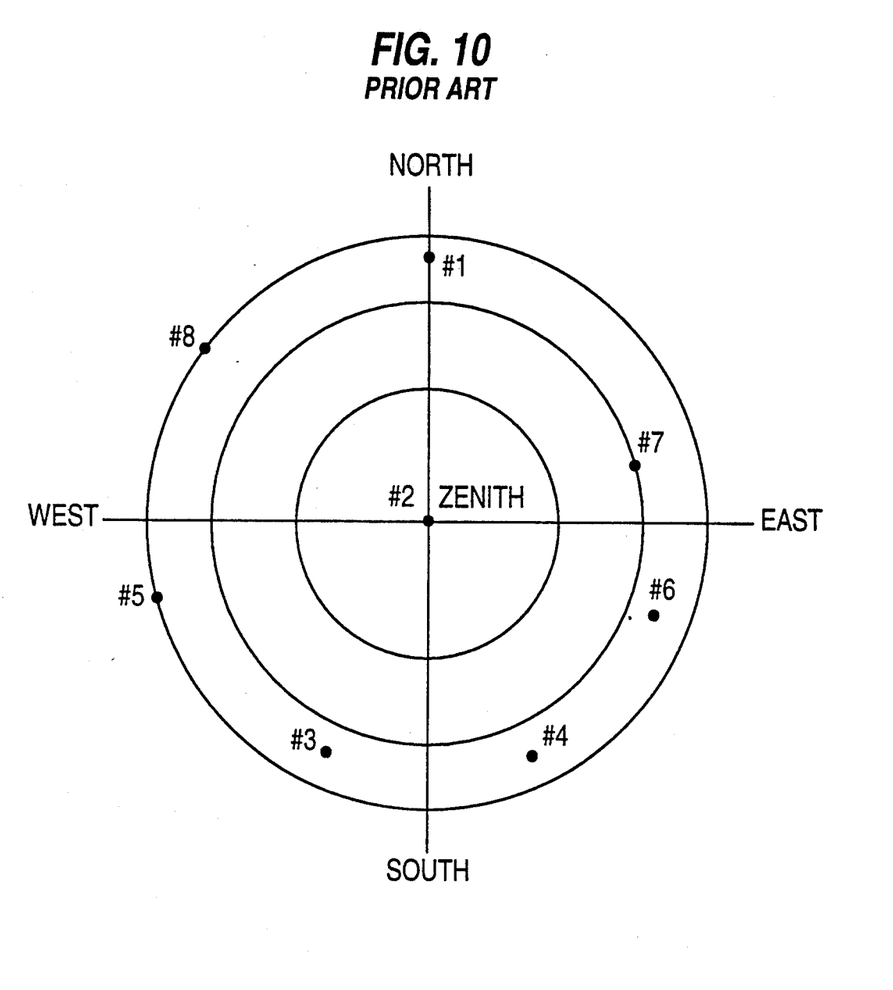
FIG. 10 is an explanatory illustration showing an example of an arrangement of GPS satellites.

When the accurate vehicle position is calculated through the GPS electric receiver, a satellite combination constituted by three or four satellites is selected from a plurality of satellites revolving around their orbits. The number of the satellites is now 17 but will be increased to 24 in the near future. As is well known in the art, the error distribution of the vehicle position supplied to the electric receiver is configured in an ellipse. The ellipse configuration formed by a certain satellite combination is different from the ellipse configuration formed by another satellite combination. In other word, the ellipse configurations are different from one another between the satellite combinations. For example, assuming that such selection is made on a certain satellite combination comprising satellites #1, #2, #3 and #4 in the neighborhood of the north-south line passing through the vehicle position as shown in FIG. 10, an ellipse having a major axis extending in the east-west direction is formed to show an error distribution of the vehicle position. When such selection is, on the other hand, made on another satellite combination comprising satellites #2, #5, #6 and #7 in the neighborhood of the east-west line passing through the vehicle position, an additional ellipse having a major axis extending in the north-south direction is formed to show an additional error distribution of the vehicle position.

On the other hand, the GPS receiver is required to frequently measure so called "Doppler shift" taking place upon receiving the electric waves from the GPS satellite for the purpose of detecting the travel direction of the vehicle. To measure the Doppler shift, it is necessary that the vehicle be traveling at relatively high speeds. Therefore, the travel direction of the vehicle can not be measured unless it is travel on highways and thus the GPS could not be used at all times in the correction of the vehicle direction.

It is, therefore, an object of the present invention to provide a vehicle position detecting apparatus which is designed and constituted in view of the foregoing configuration of error distribution of the vehicle position derived from the GPS receiver so as to enhance the accuracy of the vehicle position at a higher level and to enable the conventional matching method to continue in a stable state for a long period of time.

It is another object of the present invention to provide a vehicle position detecting apparatus which can minimize various errors detected by various sensors or means so as to enhance the accuracy of the vehicle position at a higher level.

SUMMARY OF THE INVENTION

The foregoing objects of the present invention can be achieved by providing apparatus for detecting the position of a vehicle, comprising: direction detecting means for detecting the travel direction of the vehicle, distance detecting means for detecting the travel distance of the vehicle, vehicle position estimating means for estimating the vehicle position on the basis of the travel direction of the vehicle detected by the direction detecting means and the travel distance of the vehicle detected by distance detecting means, road network data storing means for storing road network data to be selected in response to the destination, travel road determining means for determining a current travel road of the vehicle by comparing the vehicle position estimated by the estimating means and the road network data stored by the road network data storing means, electric wave receiving means for receiving electric waves from a plurality of satellites revolving around the earth to produce vehicle position data on the basis of the received electric waves, satellite designating means for designating at least three satellites from the plurality of satellites to form a designated satellite combination, accurate vehicle position calculating means for calculating accurate vehicle position on the basis of the vehicle position data supplied by the designated satellite combination and received by the receiving means, and position correcting means for correcting the vehicle position estimated by the estimating means on the basis of the accurate vehicle position calculated by the accurate vehicle position calculating means in such a manner that the vehicle position data supplied from the designated satellite combination includes a minimum error in an extending direction of the determined travel road in the neighborhood of the accurate vehicle position after the current travel road of the vehicle is determined by the travel road determining means.

In addition, the foregoing objects of the present invention can be achieved by providing another apparatus for detecting the position of a vehicle, comprising: direction detecting means for detecting the travel direction of the vehicle, distance detecting means for detecting the travel distance of the vehicle, vehicle position estimating means for estimating the vehicle position on the basis of the travel direction of the vehicle detected by the direction detecting means and the travel distance of the vehicle detected by distance detecting means, road network data storing means for storing road network data to be selected in response to the destination, travel road determining means for determining a current travel road of the vehicle by comparing the vehicle position estimated by the estimating means and the road network data stored by the road network data storing means, electric wave receiving means for receiving electric waves from a plurality of satellites revolving around the earth to produce vehicle position data on the basis of the received electric waves, satellite designating means for designating at least three satellites from the plurality of satellites to form a designated satellite combination, accurate vehicle position calculating means for calculating accurate vehicle position on the basis of the vehicle position data supplied by the designated satellite combination and received by the receiving means, and position correcting means for correcting the vehicle position estimated by the estimating means on the basis of the accurate vehicle position calculated by the accurate vehicle position calculating means in such a manner that the vehicle position data supplied from the designated satellite combination includes a minimum error substantially at a right angle to an extending direction of any one of travel roads in the neighborhood of the accurate vehicle position before the current travel road of the vehicle is determined by the travel road determining means.

Furthermore, the foregoing objects of the present invention can be achieved by providing a further apparatus for detecting the position of a vehicle, comprising, direction detecting means for detecting the travel direction of the vehicle, distance detecting means for detecting the travel distance of the vehicle, vehicle position data estimating means for estimating vehicle position data on the basis of the travel direction of the vehicle detected by the direction detecting means and the travel distance of the vehicle detected by distance detecting means, vehicle position data deriving means for deriving vehicle position data by receiving electric waves from a plurality of satellites revolving around the earth, first direction calculating means for calculating a first travel direction of the vehicle on the basis of two time-lagged vehicle position data derived by the vehicle position data deriving means, second direction calculating means for calculating a second travel direction of the vehicle during the time that the two time-lagged vehicle position data are derived on the basis of the estimated vehicle position data supplied from the vehicle position data estimating means, direction correcting means for correcting an absolute direction of the vehicle on the basis of the first calculated travel direction of the vehicle and the second calculated travel direction of the vehicle, and the first calculating means comprising satellite designating means for designating at least three satellites from the plurality of satellites to form a designated satellite combination and to instruct the vehicle position deriving means to derive the vehicle position data supplied from the designated satellite combination and memorizing means for memorizing a plurality of vehicle position data concurrently supplied from a plurality of designated satellite combinations, whereby the first calculating means instructs the satellite designating means to designate a provisional satellite combination and determines an optimum satellite combination which supplies vehicle position data including a minimum error at right angle to the travel direction of the vehicle calculated on the basis of two time-lagged vehicle position data supplied from the provisional satellite combination, and for calculating the travel direction of the vehicle on the basis of the vehicle position data supplied from the optimum satellite combination and memorized by memorizing means.

BRIEF DESCRIPTION OF THE DRAWINGS

The features and advantages of a vehicle position detecting apparatus proposed by the present invention will be more clearly understood from the following description take in conjunction with the accompanying drawings in which.

DESCRIPTION OF THE PREFERRED EMBODIMENTS

A first embodiment of a vehicle position detecting apparatus according to the present invention will be hereinafter described with reference to FIGS. 1 to 6 of the drawings.

It should be noted that the term "error ellipse" used throughout the disclosure means elliptical error distribution of a vehicle position derived on the basis of a GPS receiver data from a certain satellite combination constituted by at least three man-made satellites.

Figure 1:
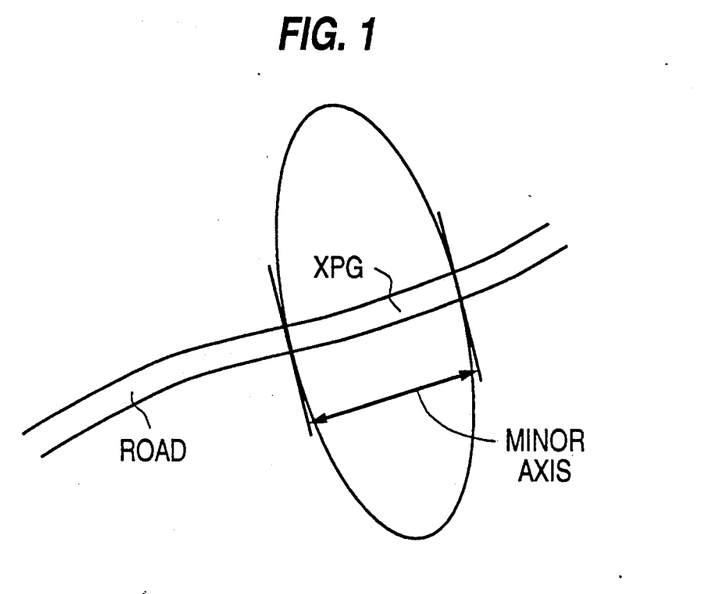
FIG. 1 is an explanatory illustration showing the relation between the direction of a travel road and the minor axis of an error ellipse extending around an accurate vehicle position PG derived by the GPS.
Figure 2:
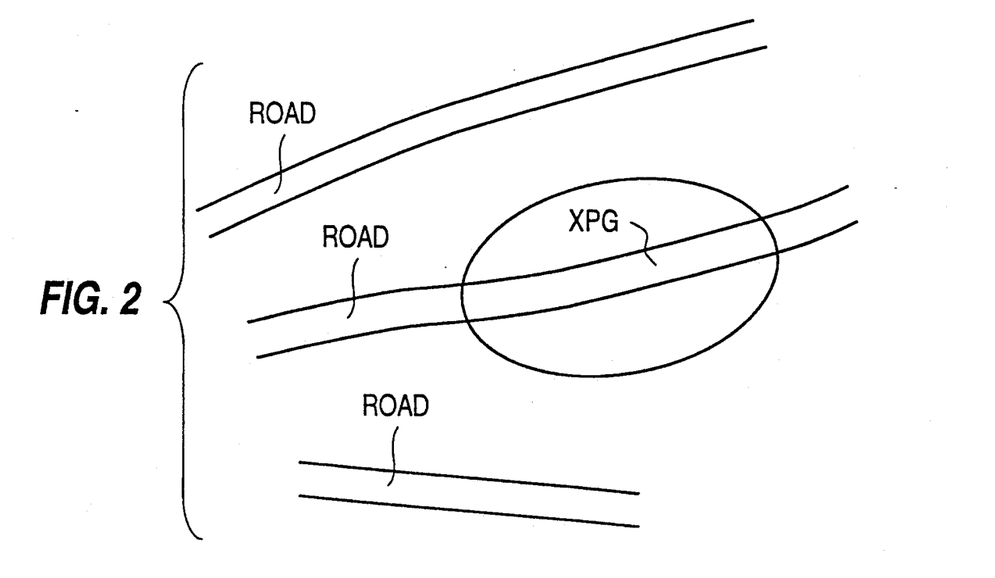
FIG. 2 is an explanatory illustration showing the relation between direction of three roads and the minor axis of another error ellipse extending around the accurate vehicle position PG derived by the GPS.
Figure 3:
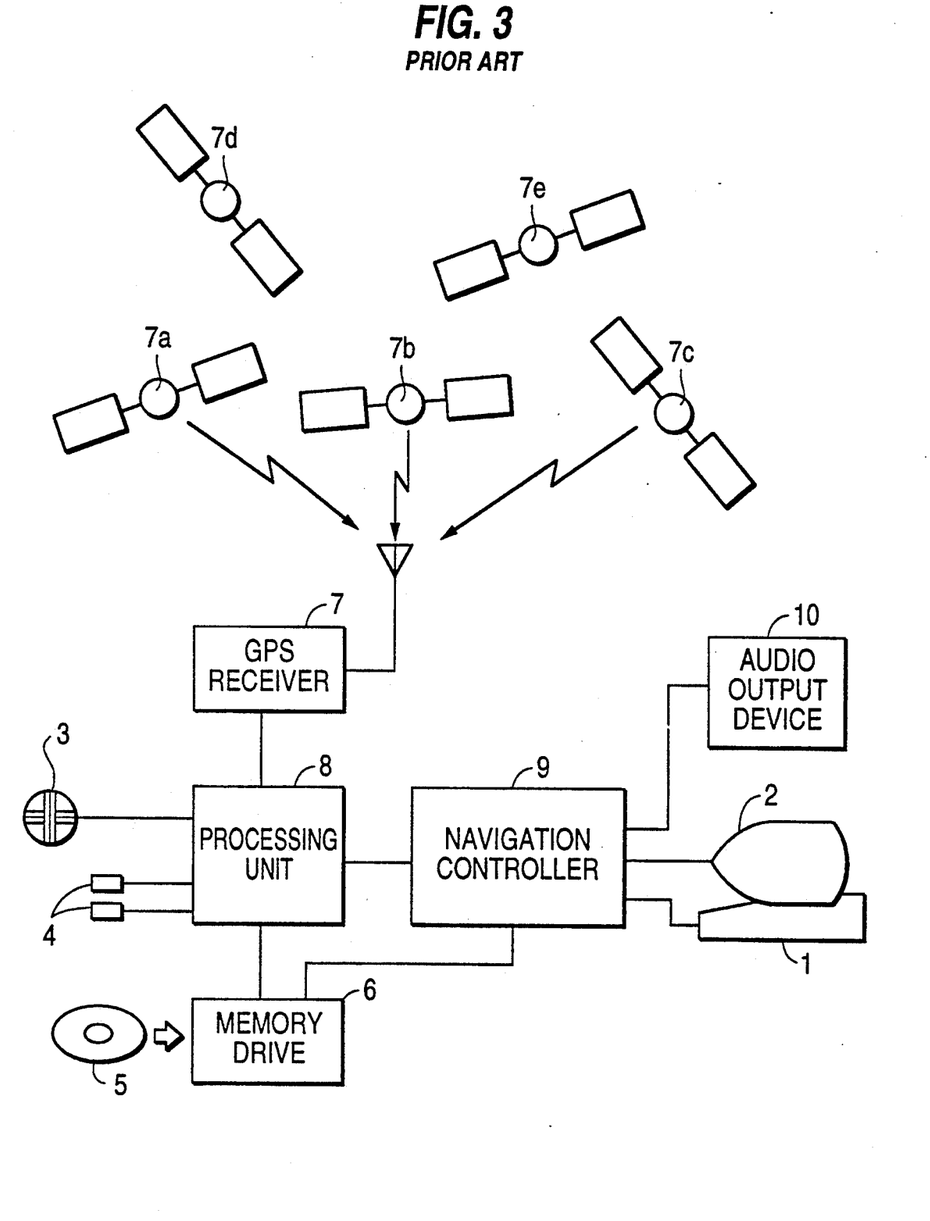
FIG. 3 is a schematic block diagram of a first embodiment of the vehicle position detecting apparatus according to the present invention.

The vehicle position detecting apparatus according to the present invention is shown in FIG. 3 as comprising a console 1, a display 2, a direction sensor 3, a distance sensor 4, a road map memory 5, a memory drive 6, a GPS receiver 7, a processing unit 8, a navigation controller 9 and an audio output device 10. The console 1 comprises a keyboard for entry of start and stop signals to the processing unit 8. The display 2 comprises a cathode-ray tube (CRT) or a liquid crystal display unit having a transparent touch panel on the screen thereof for representing a menu supplied from the navigation controller 9, so that the driver can touch the touch panel on the display 2 to enter various kinds of road maps, the magnifying power of the map, the destination and so forth. The display 2 serves to interface between the driver and the navigation controller 9. The direction sensor 3 comprises a geomagnetic sensor, a gyro, a turning angular velocity sensor and the like for detecting the variation of the travel direction of the vehicle. The turning velocity sensor is designed to detect a turning angle on the basis of difference between the revolutions of right and left wheels. The distance sensor 4 comprises a wheel sensor, wheel speed sensor, or the like for detecting the distance on the basis of the travel speed of the vehicle and the revolution of the wheel. The road map memory 5 comprises a large capacity memory medium such as a CD-ROM (Compact Disc of Read Only Memory), a magnetic tape or the like for memorizing the map data having many graphically displayed maps divided into mesh-like form. On the display 2 is displayed the map data including many maps each divided into a plurality of mesh units each having road types and coordinate positions represented in a graphically displaying fashion. The road map memory 5 has memorized therein road network data for matching the maps at each of the mesh units. The road network data comprises data combining nodes indicative of junctions and links indicative of road segments, data indicative of the distances of the links, dada indicative of the time periods required for traveling the full distances of the links, data indicative of discriminating the sorts of roads (highways, trunk lines, streets, etc.), data indicative of road widths, point data indicative of identifying cities, towns, villages, famous facilities, conspicuous points on the railways. The map data to be displayed on the display 2 comprises a plurality of maps different in a reduced scale in response to the measurements of the divided mesh units in the road map. The memory drive 6 functions to read out the data from the road map memory 5. The GPS receiver 7 is designed to decord pseudo-noise cords received from a certain satellite combination constituted by three or four satellites for measurement of electric wave delay times from those satellites and for calculating the accurate vehicle position of the vehicle on the earth. More specifically, the GPS receiver 7 receives radio electric waves from satellites 7a, 7b and 7c selected and designated from satellites 7a to 7e revolving on their orbits. The navigation controller 9 performs various calculations and controls each including calculation of guiding paths, reference and reading-out of road maps in the predetermined range, making of the displaying data for guiding the driver, operation of the display 2 and the audio output device 10, and control of the processing unit 8. The processing unit 8 estimates the degree of similarity between the roads for the vehicles and the vehicle existence probability whether the vehicle probably exists on the target road so as to correct the vehicle position on the basis of the estimated results and the vehicle position PG calculated from the GPS. If the estimated results are satisfactory, the correction of the vehicle position base on the vehicle position PG may be not performed.

The processing unit 8 calculates the travel distance detected by the distance sensor 4 and the variation quantity detected by the direction sensor 3 in the travel direction of the vehicle and estimates the vehicle position on the basis of the comparison of the above calculated data and the road network data read out by the memory drive 6. In addition to the functions as mentioned above, the processing unit 8 corrects adequately the estimated vehicle position on the basis of the accurate vehicle position PG derived from the GPS so as to output the final real vehicle position. Further, the processing unit 8 can instruct the GPS receiver 7 to receive electric waves transmitted from the three or four specific satellites revolving around the earth. The navigation controller 9 functions to receive from the processing unit 8 the signals indicative of the final real vehicle positions and to display the current vehicle position and the destination on the map in a superimposed fashion. More specifically, the navigation controller 9 comprises a microcomputer, a graph processor and an image processing memory for displaying menu, map reference, scale change, scroll, current position and direction of the vehicle, destination and conspicuous points, and distance and direction from the current vehicle position to the destination.

Figure 4:
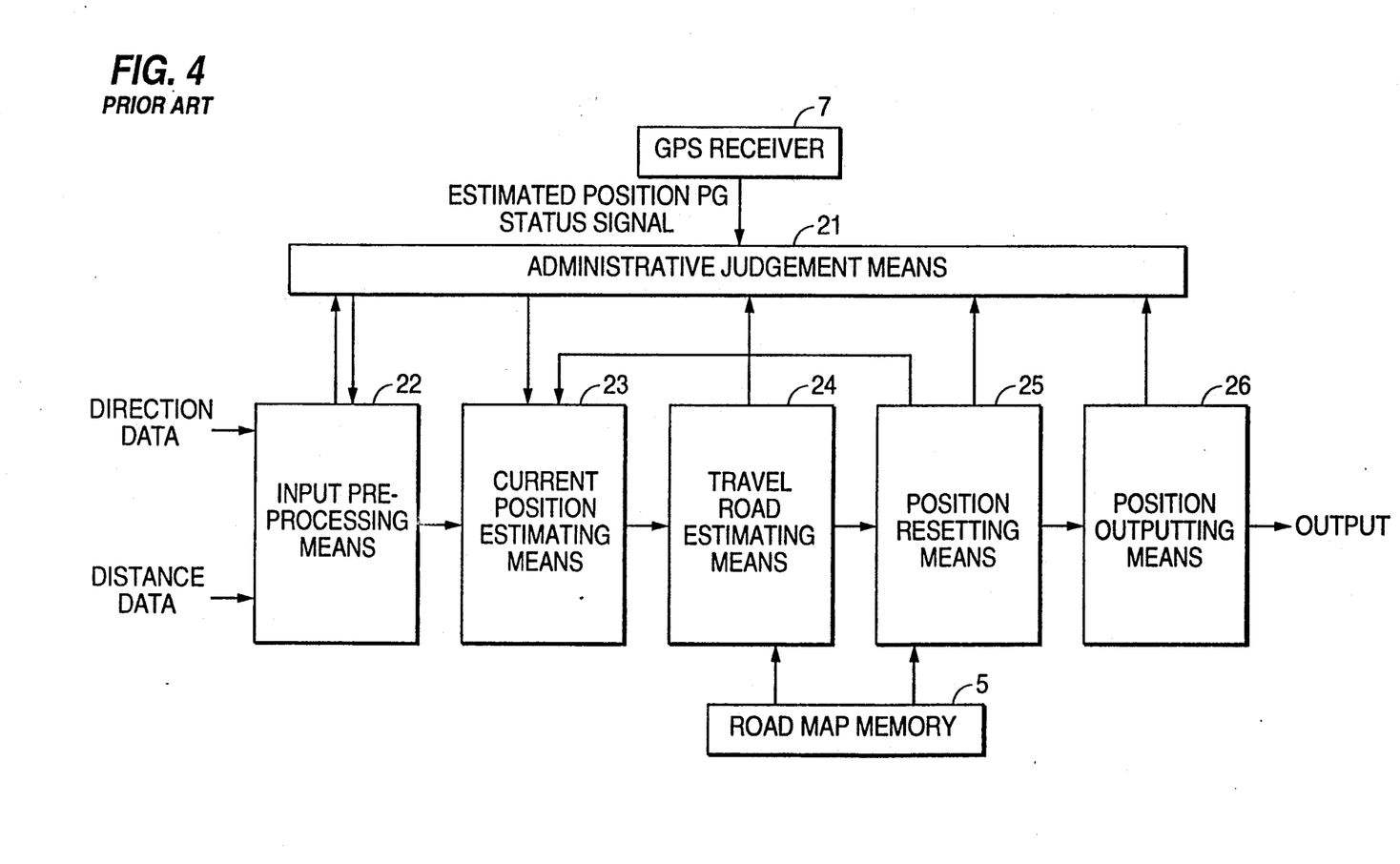
FIG. 4 is a schematic block diagram showing the processing unit illustrated in FIG. 3.

FIG. 4 schematically illustrates the structure of the processing unit 8.

The processing unit 8 comprises administrative judgement means 21, input reprocessing means 22, current position estimating means 23, travel road estimating means 24, position resetting means 25 and position outputting means 26. The input reprocessing means 22 receives the direction data sampled from the direction sensor 3 and distance data sampled from the distance sensor 4, and calculates an optimum estimated direction by calibration or filtering. Based on the optimum estimated direction and distance obtained from the input preprocessing means 22, the current position estimating means 23 calculates an optimum estimated vehicle position by the dead reckoning method. In addition, the current position estimating means 23 receives a corrected current position obtained from the position resetting means 25 to update the estimated vehicle position. The travel road estimating means 24 calculates repeatedly the degree of similarity between the road network data obtained from the road map memory 5 and the estimated vehicle position in order to obtain an estimated position of the vehicle on the road, and also calculates the probability area of the accurate vehicle position. When the estimated vehicle position is corrected on the basis of the accurate vehicle position derived from the GPS, the position resetting means 25 is reset to renew the current vehicle position on the basis of the estimated vehicle position.

Figure 5:
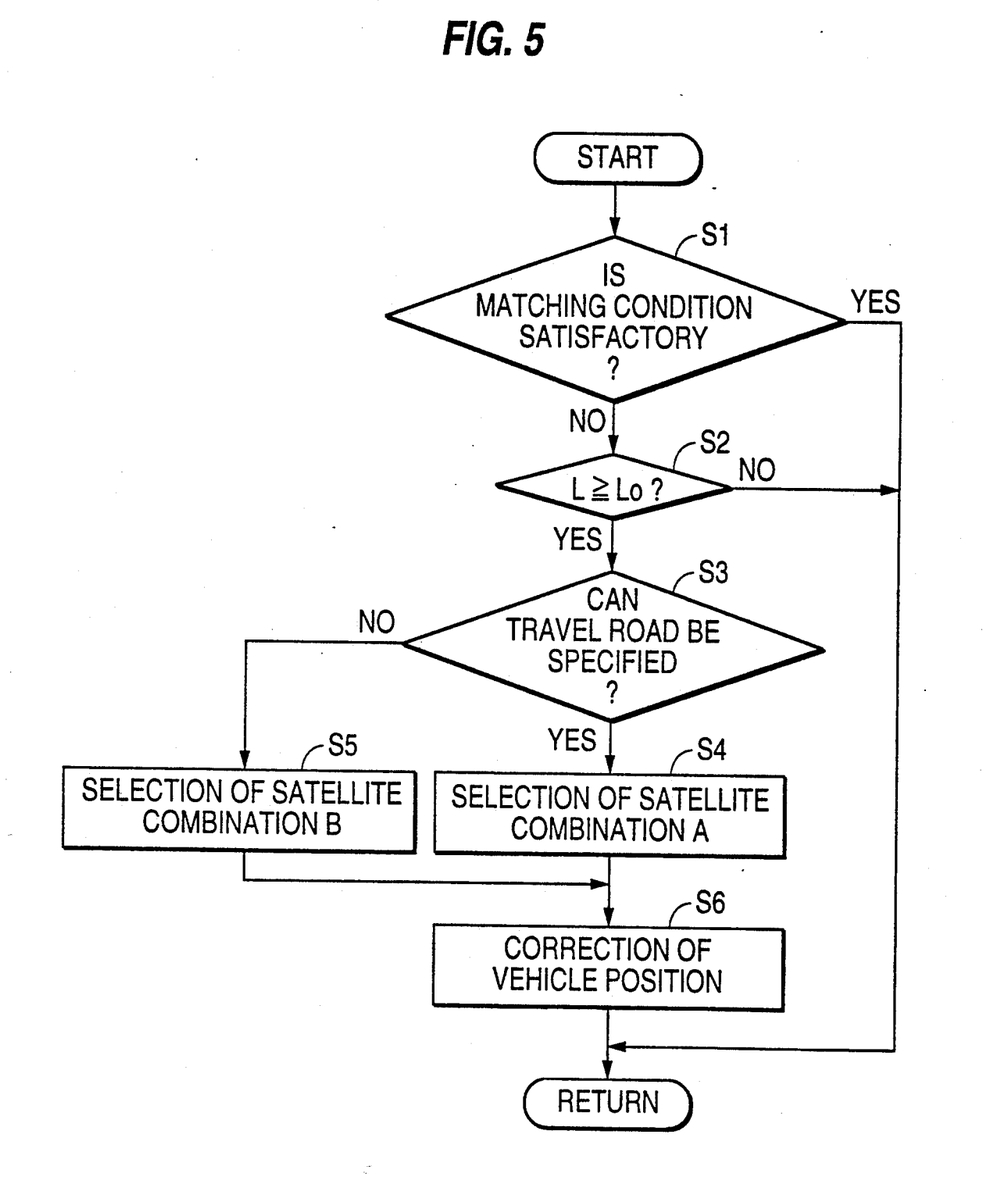
FIG. 5 is a flowchart of the process performed by the first embodiment of the vehicle position detecting apparatus illustrated in FIG. 3.

Based on the accurate vehicle position PG that has been obtained from the GPS receiver 7, and the probability area of the accurate vehicle position which is determined on the basis of the arrangement of the satellites 7a, 7b and 7c or status signal representing a received state of radio waves from the satellites, and also based on the estimated vehicle position that has been obtained by the travel road of the estimated vehicle position that has been obtained by the travel road estimating means 24, degree of similarity, and probability area of the estimated vehicle position, the administrative judgement means 21 corrects the optimum estimated means 23, by algorithm shown in FIG. 5. A new estimated vehicle position that has been obtained from the corrected optimum estimated position is supplied to the position outputting means 26, which then supplies the new estimated vehicle position to the navigation controller 9.

The algorithm used for correcting the optimum estimated position or optimum vehicle position PG with the aid of the accurate position of the vehicle that has been obtained from the GPS receiver 7, will be hereinafter be described with respect to FIG. 5.

Figure 6:
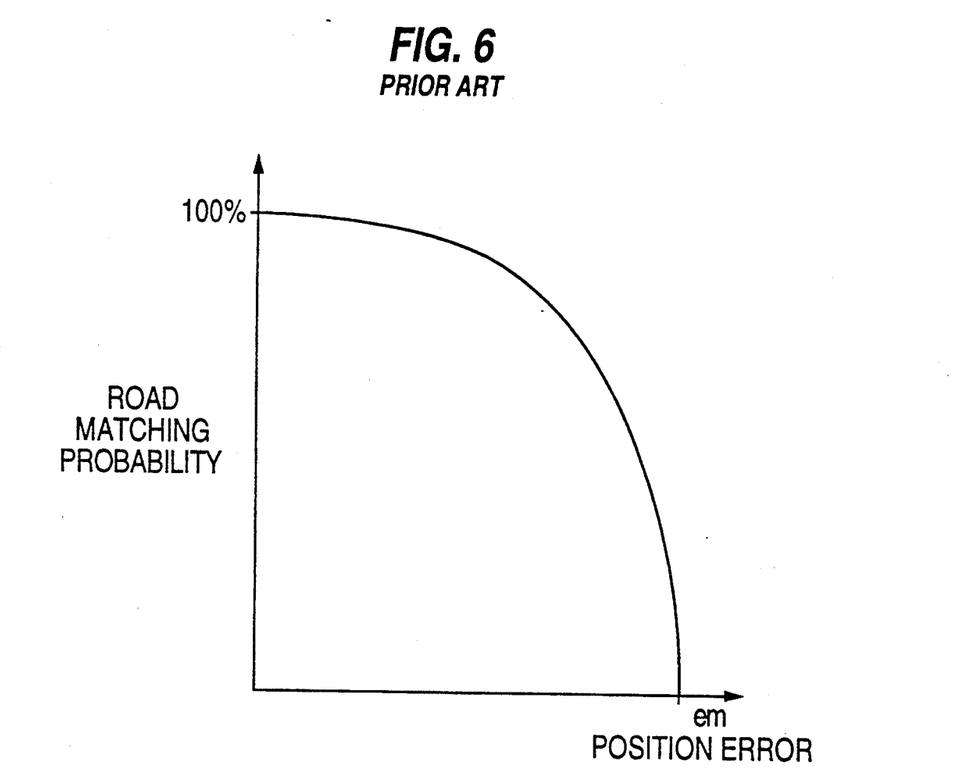
FIG. 6 is an explanatory diagram showing the relation between the road matching probability and the position error derived by the first embodiment of the vehicle position detecting apparatus illustrate in FIG. 3.

In FIG. 6, the horizontal axis represents a position error between the optimum estimated position obtained from the current position estimating means 23 by the dead reckoning method and the real position of the vehicle, and the vertical axis represents a probability of matching an real road and the optimum estimated position obtained by calculating the optimum estimated position and the network data.

The position error between the optimum estimated position obtained from the current position estimating means 23 by the dead reckoning method and the real position of the vehicle is first calculated. The degree of similarity between the above described optimum estimated position and the road network data is then calculated to obtain a probability of matching with an real road. Consequently, the relationship between the position error and the road matching probability (degree of similarity) is obtained as shown in FIG. 6. That is, if the position error is small, then the optimum vehicle position can be certainly obtained on road, while the degree of similarity between the optimum estimated position and the road pattern is being calculated repeatedly during traveling of the vehicle. In other word, the vehicle position can be specified on a specific road. If, on the other hand, the position error is increased to a limit level, the matching probability is greatly reduced even if the degree of similarity to the road pattern is calculated. If the position error exceeds the point em shown in FIG. 6, the map matching method is no longer applicable even if the degree of similarity is calculated repeatedly. In this case, the optimum estimated position obtained from the current position estimating means 23 by the dead reckoning method is required to be corrected by some other methods since the vehicle position cannot be specified on a specific road.

Even if the vehicle position can be found in the road, the vehicle position should be precisely specified on the road. For example, the vehicle turns at the intersection, whereupon the direction of the vehicle is abruptly varied. If there is an intersection on the road indicated in the road network pattern near the vehicle, the vehicle position can be specified on the road. However, the vehicle position can not be specified on the road when the vehicle travels on the road in a simple road network pattern such as a highway so that the position error is gradually increased. In this case, the vehicle position is required to be specified on the road by some other methods.

Therefore, in order to correct the optimum estimated vehicle position, the administrative judgement means 21 corrects the vehicle position with the aid of the estimated position that has been obtained from the GPS receiver 7 under a certain condition, the feeds the corrected position back to the current position estimating means 23.

First, in step S1 shown in FIG. 5, the travel road estimating means 24 repeatedly calculates, over a certain travel distance (for example, more than 2 km), the degree of similarity between the road network data obtained from the road may memory 5 and the optimum estimated position that has been obtained from the current position estimating means 23 by the dead reckoning method, and determines if an optimum vehicle position has been obtained with the aid of the calculated degree of similarity. If the vehicle position is calculated in a satisfactory probability in the step S1, "YES" is selected to make the step to return to "RETURN". If the vehicle position is not calculated in a satisfactory probability in the step AS, "NO" is selected to make the step S1 to advance to a step S2. On the step S2, determination is made on whether or not the vehicle travels over the predetermined distance Lo after the vehicle position is previously corrected. If the vehicle does not travel over the above predetermined distance Lo, "NO" is selected to make the step S2 to return to "RETURN" to avoid the frequent correction performed by the administrative judgement means 21. If the vehicle travel L over the above predetermined distance Lo, "YES" is selected to make the step S2 to advance to a step S3. In the step S3, determination is made on whether or not the road to be traveled by the vehicle is specified. If the road to be traveled by the vehicle is specified, the processing means 8 selects a satellite combination A having a major axis of an error ellipse extending substantially at a right angle to the direction of the road to be traveled by the vehicle so as to calculate the accurate vehicle position PG in a step S4. It is therefore to be understood that the vehicle position is specified on the road within a relatively narrow range at a high probability. If the road to be traveled by the vehicle is not specified, the processing unit selects another satellite combination B having a major axis of an error ellipse extending substantially in parallel relationship with the direction of the road to be traveled by the vehicle so as to calculate the accurate vehicle position PG in a step S5. It is therefore to be noted that the road to be traveled by the vehicle is readily distinguishable from other roads in the neighborhood of the above mentioned road, thereby making it possible to specify the road to be traveled by the vehicle. The vehicle position is determined on the basis of the accurate vehicle position calculated by the processing unit 8 based on the electric waves received by the GPS receiver 7 from any one of the satellite combinations A and B in a step 6. In this way, the vehicle position can be corrected at a satisfactory probability in the place of the insufficient probability obtained by the map matching method. The vehicle position thus corrected is then recognized as an initial vehicle position which is subsequently used for calculation of the another vehicle position with the aid of the map matching method.

As will be understood from the foregoing description, the accurate vehicle position can be calculated by selecting a satellite combination in such a manner that the error ellipse for the accurate vehicle position obtained from the GPS receiver has a minimum error with respect to the direction extending toward the road to be traveled by the vehicle when the road is specified during detection of the vehicle position by the map matching method so that the vehicle position is corrected to be specified within the relatively narrow range, thereby bringing about relatively high probability for determination of the vehicle position. In the event that there are a plurality of roads extending along the road to be traveled by the vehicle, the accurate vehicle position is calculated by selecting a satellite combination such a manner that the error ellipse for the accurate vehicle position obtained by the GPS receiver has a minimum error with the respect to the direction extending at a right angle to the road to be traveled by the vehicle so that the road to be traveled by the vehicle is readily distinguishable from other roads in the vicinity of the above road, thereby making it possible to easily specify the road to be traveled by the vehicle. In the vehicle position detecting apparatus according to the present invention, the detection accuracy of the vehicle position is enhanced at a high level and thus makes it possible to have the map matching method stably continue for a long period of time. In addition, the detection accuracy is ensured even if the road maps are outdated and thus somewhat inaccurate.

Figure 7:
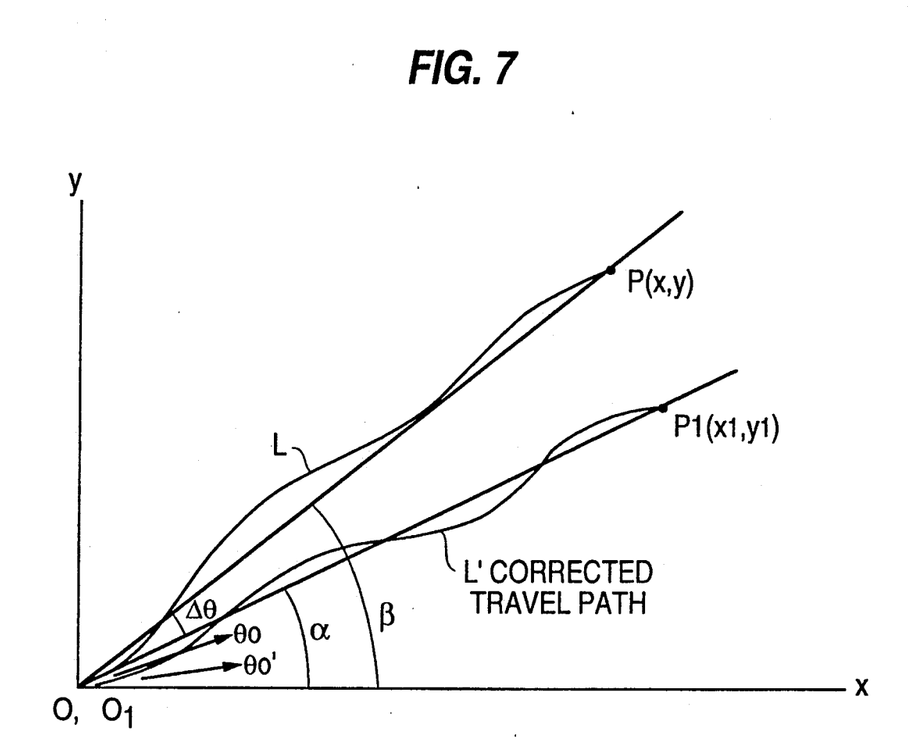
FIG. 7 is an explanatory diagram of a vehicle travel path for a second embodiment of the vehicle position detecting apparatus according to the present invention.

A second embodiment of a vehicle position detecting apparatus according to the present invention will be hereinafter described with reference to FIGS. 7 to 9 to of the drawings.

First, the principle of the another embodiment will be explained with reference to FIG. 7.

When the vehicle position deriving means derives first vehicle position data, the vehicle position estimating means has estimated vehicle position which is indicated by reference character O. When the vehicle position deriving means derives second vehicle position data, the vehicle position estimating means has estimated vehicle position which is indicated by reference character P. The vehicle positions O and P are hereinafter referred to as "estimated vehicle positions" and are connected by a travel path which is indicated by reference character L. In addition, vehicle positions which are calculated on the basis of the vehicle position data derived by vehicle position deriving means are hereinafter referred to as "accurate vehicle position". Two accurate vehicle positions are calculated on the basis of the first and second vehicle position data derived from a provisional satellite combination constituted by at least three satellites and are respectively indicated by reference character O1 and P1.

The accurate vehicle position O1 and the estimated vehicle position O are sometimes displaced from each other or coincide with each other. The accurate vehicle position O1 coincides with the estimated vehicle position O in the case that the accurate vehicle position O1 derived by the vehicle position deriving means is used as an initial position of the vehicle. In the present embodiment having the object which is to correct the travel direction of a vehicle, it is not always necessary that the positions O1 and O coincide with each other. However, the positions O1 and O are overlapped in FIG. 7 because explanation becomes easier.

It is now assumed that the coordinate of the estimated vehicle position P is (x, y) and the coordinate of the accurate vehicle position P1 is (x1, y1). It is also assumed that when detecting the estimated vehicle position P, the vehicle position estimating means uses an initial direction $\theta$o at the origin O of the coordinate axes.

On the other hand, based on the coordinate (x1, y1) of the accurate vehicle position P1, the direction $\alpha$ of a vector OP1 at the origin O can be calculated by the following equation (a):

$$\alpha = \tan^{-1}(y1/x1) \qquad (a).$$

Then, our discussion should be made about an error of the accurate vehicle position.

It will be appreciated from the foregoing description that the ellipse configuration formed by a certain satellite combination is different from the ellipse configuration formed by another satellite combination. If a certain satellite combination comprising satellites #1, #2, #3 and #4 in the neighborhood of the north-south line passing through the vehicle position as shown in FIG. 10 is selected, an ellipse having a major axis extending in the east-west direction is formed to show an error distribution of the vehicle position. If such selection is, on the other hand, made on another satellite combination comprising satellites #2, #5, #6 and #7 in the neighborhood of the east-west line passing through the vehicle position, an additional ellipse having a major axis extending the north-south direction is formed to show an additional error distribution of the vehicle position.

Figure 8A:
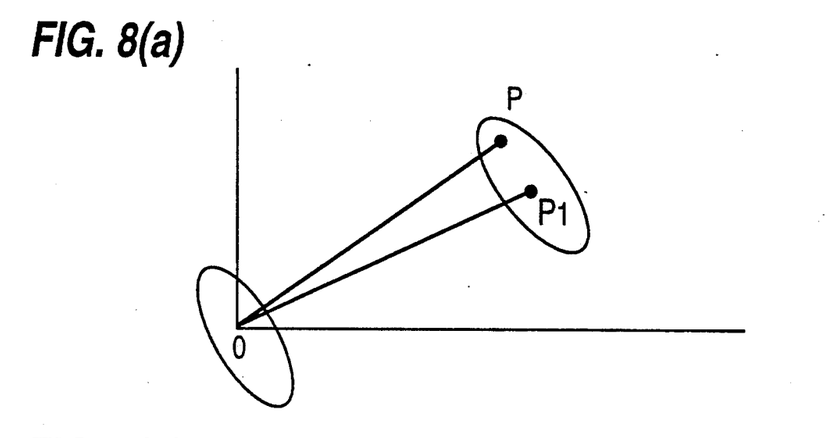
FIG. 8(a) is an explanatory diagram showing the relation between the major axes of the error ellipses and the direction OP specified by the estimated vehicle positions O and P when the directions of the major axes are deviated from the direction OP.
Figure 8B:
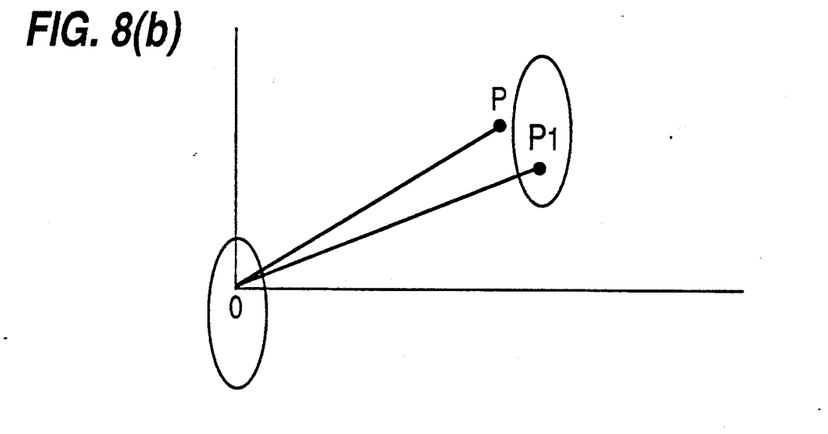
FIG. 8(b) is an explanatory diagram showing another relation similar to the foregoing relation shown in FIG. 8(a)
Figure 8C:
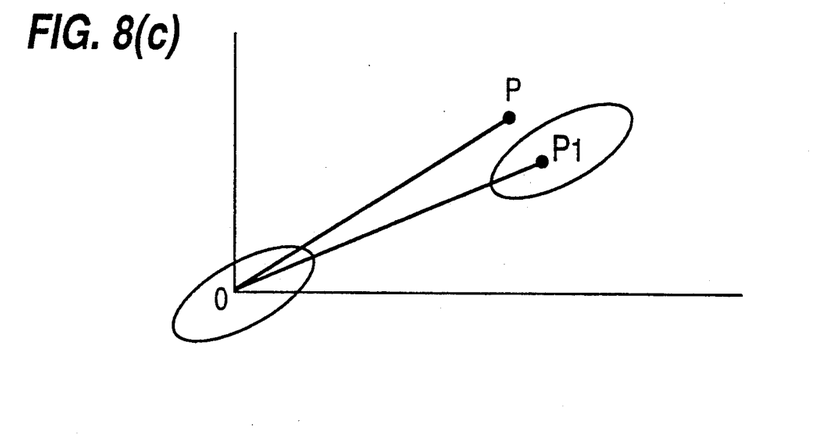
FIG. 8(c) is an explanatory diagram showing a further relation between the major axes of the error ellipses and the direction OP specified by the estimated vehicle positions O and P when the directions of the major axes coincide with the direction OP.

The relationships between the major axis of the ellipse and the direction OP1 are shown in FIGS. 8(a), 8(b) and 8(c). FIGS. 8(a) and 8(b) show examples that the major axis of the ellipse is not in registry with the direction OP1. FIG. 8(c) shows an example that the direction OP1 extends toward the major axis of the ellipse. The true accurate vehicle position P1 derived from the designated satellite combination is considered to be located within the ellipse. This means that the direction component of the error facing the major axis of the ellipse is relatively large due to the large angle between the lines connecting one end of the major axis of the ellipse and the origin 0 and connecting the other end of the major axis of the ellipse and the origin 0 in FIG. 8(a) and 8(b) and that the direction component of the error facing the minor error axis of the ellipse is relatively small due to the small angle between the lines connecting one end of the minor axis of the ellipse and the origin 0 in FIG. 8(c). In other words, the direction component of the error as shown in FIG. 8(c) is smaller than the direction component of the error as shown in FIGS. 8(a) and 8(b) in the direction OP1. This results in the fact that the error appearing in the vehicle traveling direction becomes small if a satellite combination having such an error ellipse as shown in FIG. 8(c) is selected from all the satellites revolving around the earth. It is therefore to be noted that the direction error of the accurate vehicle position P1 can be smaller than the direction error of the estimated vehicle position P if an adequate satellite combination having such an error ellipse as shown in FIG. 8(c) is selected.

If, therefore, the satellite combination selected for detecting the origin 0 is maintained identical to the satellite combination selected for detecting the accurate vehicle position P1, the offset amounts between the true accurate vehicle positions and the accurate vehicle positions which are detected at the origin 0 and the accurate vehicle position P1 are maintained constant. This makes it possible to enhance the accuracy of the direction OP1 since the same offset amounts appear in the same direction as long as the satellite combination are not varied. From the accurate vehicle position data memorized in the memorizing means, selection is performed on the satellite combination, as shown in FIG. 8(c), having an ellipse with a minor axis shortest in the direction OP1 than those of the ellipses derived from the other satellite combinations. The satellite combination is required to be maintained unchanged until a series of vehicle position correcting processes are completed. In this way, the accurate vehicle position derived from the satellite combination as shown in FIG. 8(c) is calculated so as to derive a direction "$\alpha$" connecting to the accurate vehicle position and the origin 0 and a position defined by the coordinates (x1, y1). The direction is calculated by the aforementioned equation (a) and thus can be regarded as a true travel direction of the vehicle.

In addition, based on the coordinate (x, y) of the estimated vehicle position P, the direction $\beta$ of a vector OP at the origin 0 can be known by the following equation (b):

$$\beta = \tan^{-1}(y/x) \qquad (b).$$

Therefore, if it is assumed that a difference between the direction $\beta$ and the direction $\alpha$ is $\alpha - \beta = \delta\theta$, the absolute direction $\theta$ of the vehicle can be corrected using $\delta\theta$. That is, if "x" represents a vector product and "." represents a scalar product, $$\begin{aligned}
\tan\delta\theta &= \tan(\alpha - \beta) \\
&= \sin(\alpha - \beta)/\cos(\alpha - \beta) \\
&= OP \times OP1/OP \cdot OP1 \\
&= (x\,y1 - x1\,y)/(x\,x1 + y\,y1)
\end{aligned}$$

Therefore, $\delta\theta$ can be calculated as follows:

$$\delta\theta = \tan^{-1}(x\,y1 - x1\,y)/(x\,x1 + y\,y1) \qquad (c).$$

Then, $$\theta + \delta\theta = \theta' \qquad (d).$$

By equation (d), the direction $\theta'$ can be obtained as a new absolute direction of the vehicle.

When an initial direction $\theta$o is corrected, a corrected direction can be obtained by the following equation:

$$\theta o + \delta\theta = \theta o' \qquad (d).$$

Based on the corrected direction $\theta o'$, the path traveled from the origin O can be calculated again. In this way, a more accurate travel path L' can be obtained.

Figure 9:
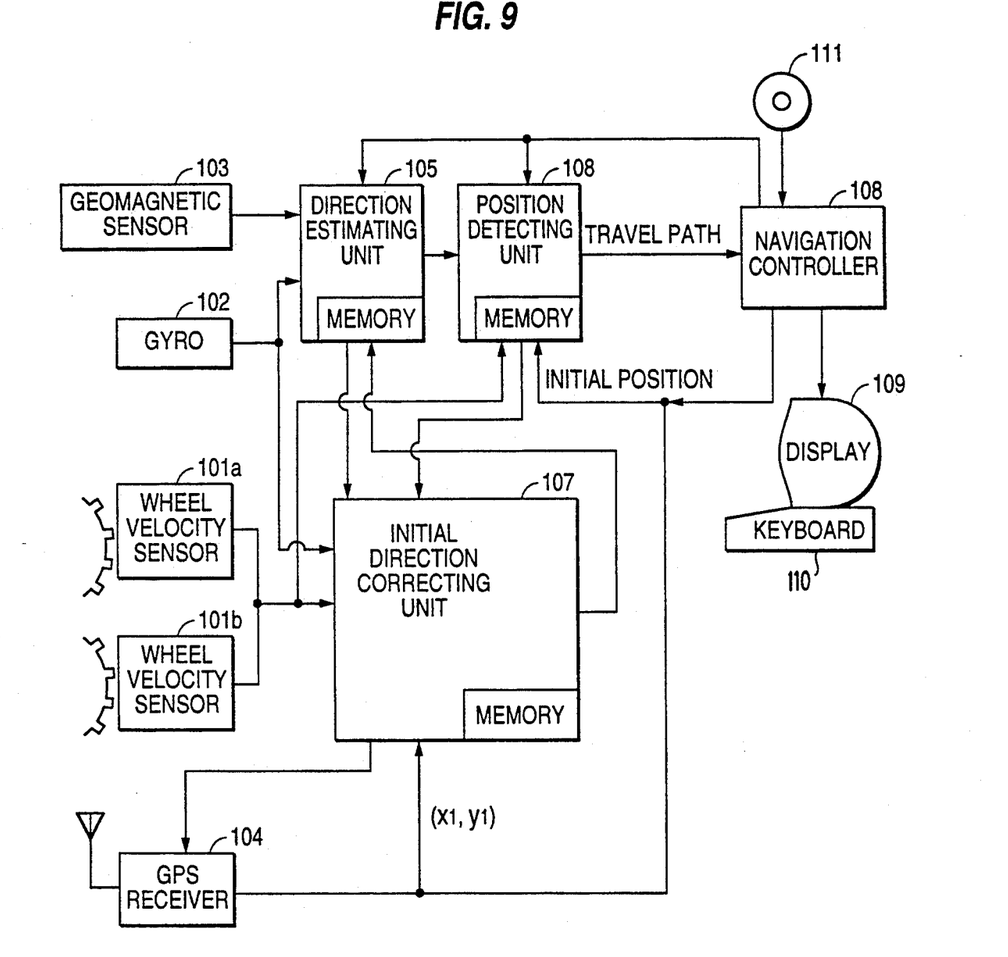
FIG. 9 is a block diagram illustrating a vehicle position detecting apparatus of the second embodiment of the vehicle position detecting apparatus.

FIG. 9 illustrates another preferred embodiment of a vehicle position detecting apparatus according to the present invention. The vehicle position detecting apparatus comprises wheel velocity sensors 101a and 101b which sense the revolutions of the left and right wheels of a vehicle, a gyro 102 for sensing a turning angular velocity, a geomagnetic sensor 103 for sensing an absolute direction of a vehicle on the basis of geomagnetism, and a GPS receiver 104. The gyro 102 is selected from among an optical fiber gyro which reads a turning angular velocity as a phase change of interference light, a vibration gyro which senses a turning angular velocity with the aid of a cantilever vibration technique of a piezoelectric element, and a mechanical type gyro. An initial direction correcting unit 107 is connected with the wheel velocity sensors 1a and 1b. A direction estimating unit 105 is connected with the gyro 102, magnetic sensor 103 and the initial direction correcting unit 107, and estimates the current direction of a vehicle on the basis of an initial direction inputted from the magnetic sensor 103 or initial direction correcting unit 107 and of data on a direction change amount sensed by the gyro 102. A position detecting unit 106 calculates data on the distance traveled from an initial position (which is set by a keyboard 10 or inputted from the GPS receiver 104) on the basis of the revolutions of the wheels sensed by the wheel velocity sensors 101a and 101b. Also, the position detecting unit 106 reads the direction data outputted from the direction estimating unit 105 and then calculates a travel path having the initial position as the starting point by the dead reckoning method. The travel path calculated by the position detecting unit 106 is inputted to a navigation controlled 108. A display 109 is provided to display the vehicle position, direction and the travel path, together with road map stored in a road map memory 111.

The road map memory 111 uses storage medium, such as a semiconductor memory, cassette tape, CD-ROM, IC memory and DAT, and stores data on road network of a predetermined area, intersections, railroad network and the like, in the form of the combination of a node and a link.

The above described navigation controller 108 is constituted by a figure processor, an image processing memory or the like, and performs retrieval of map that is displayed on the display 109, input of an initial position, switching of scale, scrolling, etc.

The satellite combination is initially designated by the initial direction correcting unit 111 to transmit the electric waves to the GPS receiver 104 for detecting the accurate vehicle position.

Based on two position data received from the GPS receiver 104, the initial direction correcting unit 107 calculates the travel direction α (FIG. 7) of the vehicle during the two receptions. Also, based on the vehicle position data outputted from the position detecting unit 106, the initial direction correcting unit 107 calculates the travel direction δ (FIG. 7) of the vehicle during the above described two receptions. Then, based on a difference $\delta\theta$ between the travel directions α and β, the absolute direction of the vehicle is corrected.

The operation of the vehicle position detecting apparatus will hereinafter be described in detail.

Before traveling, a vehicle driver selects road map of a predetermined area covering the current position of the vehicle from the road map memory 111 by the manipulation of the keyboard 110. The selected road map is displayed on the display 109. Next, the initial position of the vehicle is set by the manipulation of the keyboard 110. This setting is made by moving a cursor indicating the vehicle position on the road map. At this point, the initial direction of the vehicle is set by reading the output of the magnetic sensor 103. In this way, the data representative of the initial position and initial direction of the vehicle are supplied to the direction estimating unit 105 and the position detecting unit 106.

After the initialization described above, the vehicle is moved, and in the position detecting unit 106, data on the distance traveled from the initial position is calculated based on the wheel rotational speed signals from the wheel velocity sensors 101a and 101b. Also, in the direction estimating unit 105, the current direction of the vehicle is integrated based on the data on the angular velocity from the gyro 102. Then, data on travel path is calculated in the position detecting unit 106 on the basis of the travel distance data and the current direction data, and is supplied to the navigation controller 108. The navigation controller 108 displays the vehicle position, direction and the travel path on the picture screen of the display 109, together with the road map.

The present positions of the GPS satellites are detected from a known table and the like by the initial direction correcting unit 107 so as to enable the unit 107 to designate the satellite combination having an error ellipse with a major axis in registry with the vehicle direction which is calculated on the basis of the accurate vehicle position derived from the provisional satellite combination. The GPS receiver 104 are also designated by the initial direction correcting unit 107 to output the vehicle position data related to the satellite combination.

The correction of an initial direction in the initial direction correcting unit 107 is made as follows.

If the first vehicle position data (Xo, Yo) is inputted from the GPS receiver 104 during traveling of the vehicle, the initial direction correcting unit 107 derives a direction $\theta o$ from the direction estimating unit 105 and stores the direction $\theta o$ in the memory thereof, together with the vehicle position data (Xo, Yo). The vehicle position data (Xo, Yo) is also inputted to the position detecting unit 106 as a data on an initial position. Then, the position detecting unit 106 resets the current position to (Xo, Yo) and calculates vehicle positions on the basis of this current position (Xo, Yo) which is recognized as the starting point. Further, the vehicle position data related to the other satellite combination are memorized in the initial direction correcting unit 107.

Next, when the second vehicle position data (X1, Y1) related to the provisional satellite combination is inputted from the GPS receiver 104, the initial direction correcting unit 107 derives the current direction data $\theta$ from the direction estimating unit 105 and also the estimated vehicle position data (X, Y) from the position detecting unit 106. Based on these data, the estimated movement amount of the vehicle during these two receptions by the GPS receiver is calculated as follows:

$$(x, y) = (X, Y) - (Xo, Yo).$$

Also, based on the GPS reception data, the movement amount of the vehicle during the two receptions described above is calculated as follows:

$$(x1, y1) = (X1, Y1) - (Xo, Yo).$$

The satellite combination is designated by the initial direction correcting unit 107 so as to have an error ellipse with a major axis closest to the direction (x1, y1) so that the first and second vehicle position data related to the designated satellite combination are derived from the memory in the initial direction correcting unit 107. Then, a direction estimated error $\delta\theta$ is calculated the above described equation (c) and added to the initial direction $\theta o$ to correct the initial direction.

The initial direction $\theta o'$ thus corrected is supplied to the direction estimating unit 105, which calculates the direction data of the vehicle again on the basis of this initial direction $\theta o'$, and the position detecting unit 106 also calculates the travel path data again on the basis of the direction data calculated again. These calculations are performed with the aid of the direction data and travel distance data has been detected by the gyro 102 and wheel velocity sensors 101a and stored in a predetermined memory.

The travel path data thus calculated again by the position detecting unit 106 is inputted to the navigation controller 108 and displayed on the display 109. Therefore, the path being displayed on the display 109 is corrected to an accurate rate path, each time the position data is received by the GPS receiver 104.

It will be understood by those skilled in the art that the foregoing description is in terms of preferred embodiment of the present invention wherein various changes and modification may be made without departing from the spirit and scope of the invention, as set forth in the appended claims.

What is claimed is:

1. An apparatus for detecting the position of a vehicle, comprising:
   direction detecting means for detecting the travel direction of said vehicle;
   distance detecting means for detecting the travel distance of said vehicle;
   vehicle position estimating means for estimating a first vehicle position on the basis of the travel direction of said vehicle detected by said direction detecting means and the travel distance of said vehicle detected by said distance detecting means;
   road network data storing means for storing road network data selected for finding a current position of said vehicle;
   travel road determining means for determining a current travel road of said vehicle by comparing said first vehicle position estimated by said estimating means and said road network data stored by said road network data storing means;
   electric wave receiving means for receiving electric waves from a plurality of satellites revolving round the earth to derive vehicle position data based on said received electric waves and indicative of a second vehicle position;
   vehicle position calculating means for calculating said second vehicle position on the basis of said vehicle position data;
   satellite designating means for designating at least three satellites from said plurality of satellites, said vehicle position data derived from said designated satellites including a minimum error in an extending direction of said determined travel road in the neighborhood of said second vehicle position; and
   position correcting means for correcting said first vehicle position on the basis of said second vehicle position after said current travel road of said vehicle is determined by said travel road determining means, said second vehicle position used during the correction of said first vehicle position being calculated by said vehicle position calculating means on the basis of said vehicle position data derived from said designated satellites.

2. An apparatus for detecting the position of a vehicle, comprising:
   direction detecting means for detecting the travel direction of said vehicle;
   distance detecting means for detecting the travel distance of said vehicle;
   vehicle position estimating means for estimating a first vehicle position on the basis of the travel direction of said vehicle detected by said direction detecting means and the travel distance of said vehicle detected by said distance measuring means;
   road network data storing means for storing road network data selected for finding a current position of said vehicle;
   travel road determining means for determining a current travel road of said vehicle by comparing said first vehicle position estimated by said estimating means and said road network data stored by said road network data storing means;
   electric wave receiving means for receiving electric waves from a plurality of satellites revolving around the earth to derive vehicle position data based on said received electric waves and indicative of a second vehicle position;
   vehicle position calculating means for calculating said second vehicle position on the basis of said vehicle position data;
   satellite designating means for designating at least three satellites from said plurality of satellites, said vehicle position data derived from said designated satellites including a minimum error substantially at a right angle to an extending direction of any one of travel roads in the neighborhood of said second vehicle position; and
   position correcting means for correcting said first vehicle position on the basis of said second vehicle position before said current travel road of said vehicle is determined by said travel road determining means, said second vehicle position used during the correction of said first vehicle position being calculated by said vehicle position calculating means on the basis of said vehicle position data derived from said designated satellites.

3. An apparatus for detecting the position of a vehicle, comprising:
   direction detecting means for detecting the instantaneous travel direction of said vehicle;
   distance detecting means for detecting the travel distance of said vehicle;
   vehicle position data deriving means for deriving a plurality of first vehicle position data by receiving electric waves from a plurality of satellites revolving around the earth, said plurality of first vehicle position data being derived from a plurality of satellite combinations, respectively, each which is constituted by at least three of said plurality of satellites;
   vehicle position data estimating means for estimating second vehicle position data on the basis of said instantaneous travel direction of said vehicle detected by said direction detecting means and the travel distance of said vehicle detected by said distance detecting means;
   memorizing means for memorizing said plurality of first vehicle position data derived from said plurality of satellite combinations;
   first vectorial direction calculating means for calculating a provisional first vectorial travel direction of said vehicle on the basis of two time-lagged provisional first vehicle position data which are derived from a provisional satellite combination of said satellite combinations so as to select from said satellite combinations an optimum satellite combination which supplies said first vehicle position data including a minimum error at a right angle to said provisional first vectorial travel direction, and for calculating an objective first vectorial travel direction of said vehicle on the basis of two time-lagged objective first position data which are derived from said optimum satellite combination and memorized in said memorizing means, said two time-lagged objective first position data being simultaneous with said two time-lagged provisional first position data, respectively, and read out from said memorizing means;

second vectorial direction calculating means for calculating on the basis of said second vehicle position data a second vectorial travel direction in which said vehicle travels during the time that said two time-lagged provisional first vehicle position data of said plurality of first vehicle position data are derived from said provisional satellite combination by said vehicle position data deriving means; and direction correcting means for correcting said detected instantaneous direction of said vehicle on the basis of said first calculated vectorial travel direction of said vehicle and said second calculated vectorial travel direction of said vehicle.

* * * * *